(12) United States Patent
Liu et al.

(10) Patent No.: US 11,365,505 B2
(45) Date of Patent: Jun. 21, 2022

(54) AGITATOR FOR DRUM WASHING MACHINE AND DRUM WASHING MACHINE HAVING SAME

(71) Applicant: WUXI LITTLE SWAN ELECTRIC CO., LTD., Wuxi (CN)

(72) Inventors: Xiangkuan Liu, Wuxi (CN); Jia Wang, Wuxi (CN); Chaolin Gu, Wuxi (CN); Guangfang Lin, Wuxi (CN); Song Lu, Wuxi (CN)

(73) Assignee: WUXI LITTLE SWAN ELECTRIC CO., LTD., Wuxi (CN)

( * ) Notice: Subject to any disclaimer, the term of this patent is extended or adjusted under 35 U.S.C. 154(b) by 0 days.

(21) Appl. No.: 16/970,613

(22) PCT Filed: Sep. 27, 2018

(86) PCT No.: PCT/CN2018/107918
§ 371 (c)(1),
(2) Date: Aug. 17, 2020

(87) PCT Pub. No.: WO2020/037779
PCT Pub. Date: Feb. 27, 2020

(65) Prior Publication Data
US 2021/0087737 A1   Mar. 25, 2021

(30) Foreign Application Priority Data

Aug. 22, 2018  (CN) .......................... 201810960572.2
Sep. 20, 2018  (CN) .......................... 201811100675.8
Sep. 20, 2018  (CN) .......................... 201821547027.2

(51) Int. Cl.
*D06F 37/40* (2006.01)
*D06F 23/02* (2006.01)
(Continued)

(52) U.S. Cl.
CPC .............. *D06F 37/40* (2013.01); *D06F 23/02* (2013.01); *D06F 37/04* (2013.01); *D06F 39/083* (2013.01); *D06F 39/088* (2013.01); *F16H 1/28* (2013.01)

(58) Field of Classification Search
CPC .......... D06F 37/40; D06F 37/04; D06F 23/02; D06F 39/083; D06F 39/088; F16H 1/28
(Continued)

(56) References Cited

U.S. PATENT DOCUMENTS

| 5,941,100 A * | 8/1999 | Ahn ........................ D06F 17/06 |
| | | 68/18 FA |
| 2009/0053119 A1* | 2/2009 | Richman ................ D06F 39/02 |
| | | 422/300 |

(Continued)

FOREIGN PATENT DOCUMENTS

| CN | 203144741 U | 8/2013 |
| CN | 206418304 U | 8/2017 |

(Continued)

OTHER PUBLICATIONS

CN206418304U—machine translation (Year: 2017).*

(Continued)

*Primary Examiner* — Tinsae B Ayalew
(74) *Attorney, Agent, or Firm* — Kilpatrick Townsend & Stockton, LLP

(57) ABSTRACT

The present disclosure relates to an agitator for a drum washing machine and a drum washing machine. The agitator comprises a first agitating subsection and a second agitating subsection, and an agitating rib of the first agitating subsection is provided with water spray holes, the second agitating subsection and the first agitating subsection are separate parts, and the second agitating subsection and the first (Continued)

agitating subsection are mounted and jointly define a water spray channel in communication with the water spray hole.

17 Claims, 15 Drawing Sheets

(51) Int. Cl.
*D06F 37/04* (2006.01)
*D06F 39/08* (2006.01)
*F16H 1/28* (2006.01)

(58) Field of Classification Search
USPC .......................................................... 68/12.19
See application file for complete search history.

(56) References Cited

U.S. PATENT DOCUMENTS

2013/0312462 A1\* 11/2013 Kim ........................ D06F 21/08
68/133
2017/0191202 A1\* 7/2017 Lee ......................... D06F 37/06

FOREIGN PATENT DOCUMENTS

| CN | 107245842 A | 10/2017 |
|---|---|---|
| EP | 3178981 A1 | 6/2017 |
| EP | 3190220 A2 | 7/2017 |
| JP | S59189897 A | 10/1984 |
| JP | H02274285 A | 11/1990 |
| JP | H0368397 A | 3/1991 |
| JP | H1133287 A | 2/1999 |
| JP | H11137883 A | 5/1999 |
| JP | 2000042282 A | 2/2000 |
| JP | 2006158488 A | 6/2006 |
| JP | 2015146898 A | 8/2015 |
| KR | 100802467 B1 | 2/2008 |

OTHER PUBLICATIONS

International Search Report of PCT/CN2018/107918.
Search Report for EP application 18931100.4.
OA for JP application 2020-541593.

\* cited by examiner

B-B

AGITATOR FOR DRUM WASHING MACHINE AND DRUM WASHING MACHINE HAVING SAME

CROSS-REFERENCES TO RELATED APPLICATIONS

The present disclosure is a national phase application of International Application No. PCT/CN2018/107918, filed on Sep. 27, 2018, which claims Chinese Application No. 201811100675.8, No. 201821547027.2, filed in the Chinese Patent Office on Sep. 20, 2018 and Chinese Application No. 201810960572.2, filed in the Chinese Patent Office on Aug. 22, 2018, the entireties of which are herein incorporated by reference.

FIELD

The present disclosure relates to the field of washing machine manufacturing, in particular to an agitator for a drum washing machine and a drum washing machine having the agitator.

BACKGROUND

When a drum washing machine washes clothes, the rotation of an inner drum drives the clothes and the water in the inner drum to rotate and wash the clothes, and lifting ribs in the inner drum lift and drop the clothes to beat the clothes for washing. However, due to the single washing mode, the washing time is long and the washing ratio of clothes is relatively low, affecting the washing effect. For this reason, the applicant proposed in Chinese patent CN201710901069.5 a drum washing machine with an agitator in the inner drum. The agitator is mounted in the inner drum and is connected with a water supply device, and the agitator is driven to rotate by water supplied by the water supply device. However, for the agitator in this application, a water channel needs to be constructed inside, which in this case, adopt an integral structure. The internal water channel is very difficult to form, resulting in complex production process and high cost.

SUMMARY

Embodiments of the present disclosure are to provide an agitator for a drum washing machine, which can realize diversified washing modes, and has simple manufacturing process and low production cost.

The present disclosure also provides a drum washing machine with the agitator for the drum washing machine.

The agitator for the drum washing machine according to embodiments of the present disclosure includes a first agitating subsection having an agitating surface facing the washing cavity, the agitating surface of the first agitating subsection being provided with water spray holes; and a second agitating subsection. The second agitating subsection and the first agitating subsection are separate parts and are mounted and jointly define a water spray channel in communication with the water spray holes.

According to the agitator for a drum washing machine provided by embodiments of the present disclosure, by arranging the agitator as a first agitating subsection and a second agitating subsection which are separate parts, the first agitating subsection and the second agitating subsection are utilized to jointly define a water spray channel, so that the agitator can be ensured to have various washing modes of agitating washing and spraying washing. Meanwhile, the manufacturing process of the agitator can be simplified, the manufacturing cost is reduced, the agitator assembling is convenient, and the production efficiency is improved.

According to some embodiments of the present disclosure, the agitating surface of the first agitating subsection is configured with a plurality of agitating ribs spaced apart from each other along a circumferential direction thereof. The water spray channel corresponds to a position of at least one of the plurality of agitating ribs, and the water spray holes are arranged in the at least one of the plurality of agitating ribs.

According to some examples of the present disclosure, one of two adjacent agitating ribs corresponds to a position of the water spray channel and is provided with the water spray holes, in a circumferential direction of the first agitating subsection.

According to some embodiments of the present disclosure, the first agitating subsection is an agitating disk, the second agitating subsection is a spray frame. The spray frame is mounted in the agitating disk. The agitating surface is formed on the agitating disk, and the agitating disk is provided with a mounting surface facing away from the washing cavity.

According to some examples of the present disclosure, the agitating disk is provided with a fitting groove. The spray frame is mounted in the fitting groove and defines the water spray water channel together with an inner wall of the fitting groove.

According to some examples of the present disclosure, the spray frame has an inner cavity, a surface of the inner cavity facing a bottom wall of the fitting groove is open, and the open surface of the inner cavity is covered by the bottom wall of the fitting groove to define the water spray channel.

According to some examples of the present disclosure, a center of the mounting surface of the agitating disk is provided with a water inlet hole in communication with a water source, and the water spray channel extends outwards from the water inlet hole.

According to some examples of the present disclosure, the spray frame includes a central water collecting block; a plurality of water distributing arms spaced apart from each other along a circumferential direction of the central water collecting block, connected to an outer circumferential surface of the central water collecting block, and provided with water passing holes correspondingly in communication with the water spray holes.

According to some examples of the present disclosure, the water passing holes in each of the water distributing arms are disposed at an end of each of the water distributing arm away from the central water collecting block.

According to some examples of the present disclosure, axial directions of the water passing holes are different from each other, and a axial direction of the water spray hole is parallel to an axial direction of the corresponding water passing hole each other.

According to some examples of the present disclosure, the agitating disk includes a disk base on which the mounting surface is formed; a disk cover which is mounted on the disk base and on which the agitating surface is formed, and the spray frame is mounted between the disk base and the disk cover.

According to some examples of the present disclosure, a surface of the disk base facing the disk cover is provided with a fitting groove, and the spray frame is pressed into the fitting groove by the disk cover.

According to some examples of the present disclosure, the mounting surface of the agitating disk is provided with the fitting groove, and the spray frame is mounted in the fitting groove and ultrasonically welded to the agitating disk.

According to some examples of the present disclosure, the first agitating subsection is a disk cover, the second agitating subsection is a disk base. The disk cover and the disk base are snapped with each other. The agitating surface is formed on the disk cover and the disk base is provided with a mounting surface facing away from the washing cavity.

According to some examples of the present disclosure, at least one of the disk cover and the disk base is provided with a water flume, and the water flume is enclosed to form the water spray channel after the disk cover and the disk base are snapped with each other.

According to some examples of the present disclosure, one of the disk cover and the disk base is provided with a snap and the other is provided with a locking slot, and the snap is snapped into the locking slot.

According to some examples of the present disclosure, a water inlet hole in communication with a water source is defined in a center of the mounting surface of the disk base, and the water spray water channel extends outwards from the water inlet hole.

According to some embodiments of the present disclosure, the agitator for a drum washing machine further includes an agitating cap mounted on the agitating surface of the first agitating subsection.

According to some examples of the present disclosure, the agitating cap includes a cap base mounted on the agitating surface of the first agitating subsection; and a surface cap covering the cap base.

The drum washing machine according to embodiments of the present disclosure includes an agitator for the drum washing machine according to embodiments of the present disclosure.

The drum washing machine according to the embodiment of the present disclosure has the characteristics of simple structure, various washing modes, good washing effect, low manufacturing cost and the like by adopting the agitator for a drum washing machine according to the embodiment of the present disclosure.

According to some embodiments of the present disclosure, the drum washing machine further includes an outer tub; an inner drum rotatably mounted in the outer tub, and the agitator being rotatably mounted in the inner drum; a driver in driving connection with the inner drum through a spindle, the spindle transmitting a torque of the driver to the inner drum; a planetary gear assembly separately in driving connection with the spindle and the agitator, and transmitting a torque of the spindle to the agitator; and a water supply device separately in communication with one of the outer tub and a water source as well as the agitator, and supplying water in the outer tub or the water source to the water spray channel of the agitator. Then the water is sprayed into the inner drum through the water spray holes.

Additional embodiments of the present disclosure will be set forth in part in the description which follows, and in part will be apparent from the description, or may be learned by practice of The present disclosure.

BRIEF DESCRIPTION OF THE DRAWINGS

The accompanying drawings are intended to provide a further understanding of the present disclosure and form a part of the specification. Together with the following detailed description, they serve to explain the present disclosure, but are not intended to limit the present disclosure. In the drawings.

Figure 1:
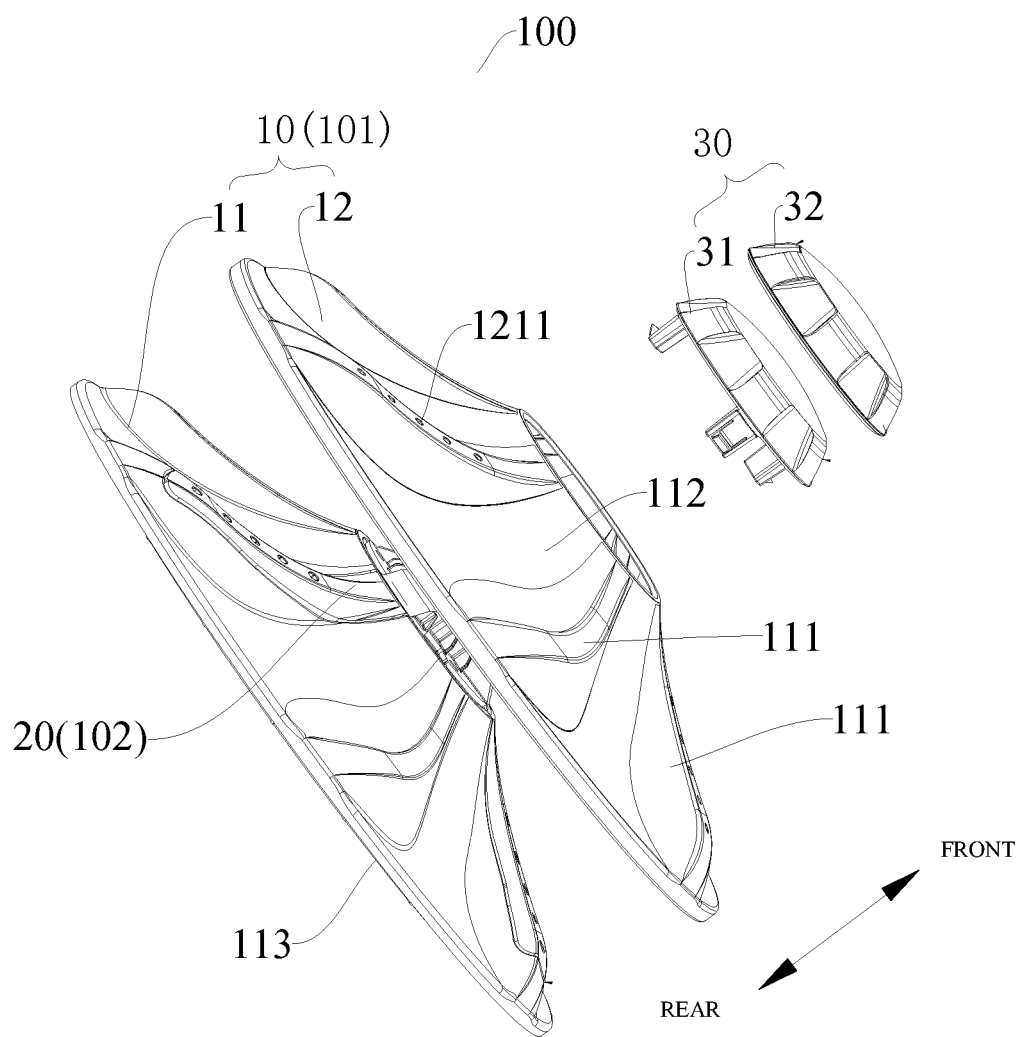
FIG. 1 is an exploded view of an agitator for a drum washing machine according to some embodiments of the present disclosure.
Figure 2:
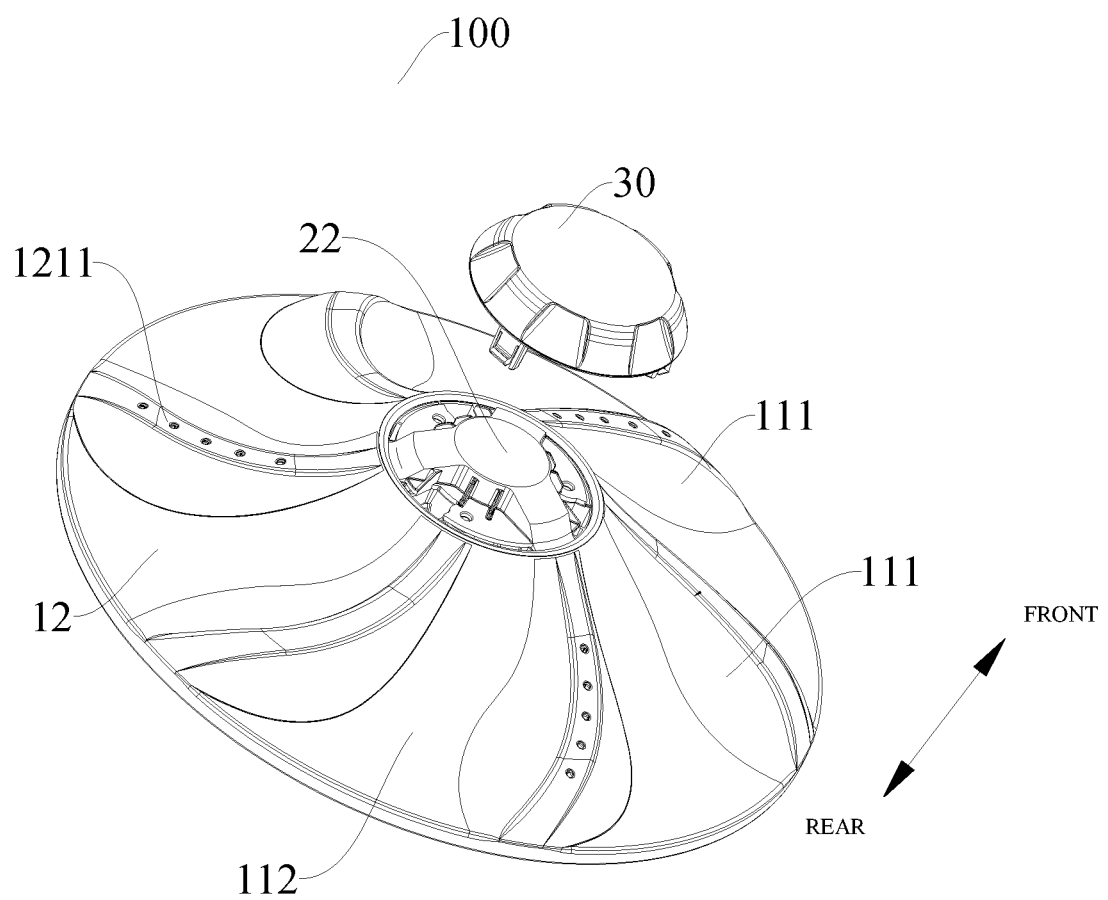
FIG. 2 is an assembly view of an agitator for a drum washing machine according to some embodiments of the present disclosure.

REFERENCE NUMERALS drum washing machine 1000;
outer tub 1; inner drum 2; spindle 41; water passing shaft 42; pipeline 43; planetary gear assembly 6;
agitator 100;
first agitating subsection 101; second agitating subsection 102;
agitating disk 10;
disk base 11; agitating rib 111; agitating surface 112; mounting surface 113; water inlet hole 114; locking slot 115; fitting groove 1111;
disk cover 12; water spray hole 1211; snap 123; water flume 124;
spray frame 20;

water distributing arm 21; central water collecting block 22; front wall 211; peripheral sidewall 212; inner cavity 213; bottom wall 214; water passing hole 2111;

agitating cap 30;

cap base 31; surface cap 32.

DETAILED DESCRIPTION OF THE DISCLOSURE

Detailed description of embodiments of the present disclosure will be described in detail below with reference to the accompanying drawings. It should be understood that the embodiments described herein are only for the purpose of illustrating and explaining the present disclosure and are not intended to limit the present disclosure.

An agitator 100 for a drum washing machine according to an embodiment of the present disclosure will be described below with reference to FIGS. 1 to 16.

An agitator 100 for a drum washing machine according to an embodiment of the present disclosure includes a first agitation section 101 and a second agitation section 102.

The first agitating subsection 101 has an agitating surface 112 facing a washing cavity, i.e. toward the front (a user's direction). The agitating surface 112 of the first agitating subsection 101 is provided with water spray holes 1211, so that clothes in the washing cavity can be agitated and sprayed water, and the washing effect is improved.

The first agitating subsection 101 and the second agitating subsection 102 are separate parts, and are mounted in a matching manner. The first agitating subsection 101 and the second agitating subsection 102 jointly define water spray channels in communication with the water spray holes 1211. By defining the water spray channels by the separate first agitating subsection 101 and second agitating subsection 102 jointly, not only the combination of spraying washing and agitating washing can be realized to improve the washing effect, but also the manufacturing difficulty and the production cost can be effectively reduced. In one embodiment, by arranging the agitator 100 as two separate parts (i.e., the first agitating subsection 101 and the second agitating subsection 102), open grooves can be formed in at least one of the first agitating subsection 101 and the second agitating subsection 102 and after the two parts are assembled, the open portions are covered to form the water spray channels. Therefore, there is no need to construct a closed space in one part to form the water spray channel. The forming process is simpler, the manufacturing difficulty is greatly reduced, and the production cost is further reduced.

Therefore, according to the agitator 100 for a drum washing machine according to the embodiment of the present disclosure, by arranging the agitator 100 as the first agitating section 101 and the second agitating section 102 which are separate parts, the first agitating section 101 and the second agitating section 102 are utilized to jointly define the water spray channels, thus not only ensuring the agitator 100 to have double functions of agitating washing and spraying washing, but also simplifying the manufacturing process of the agitator 100, reducing the manufacturing cost and improving the production efficiency.

Figure 3:
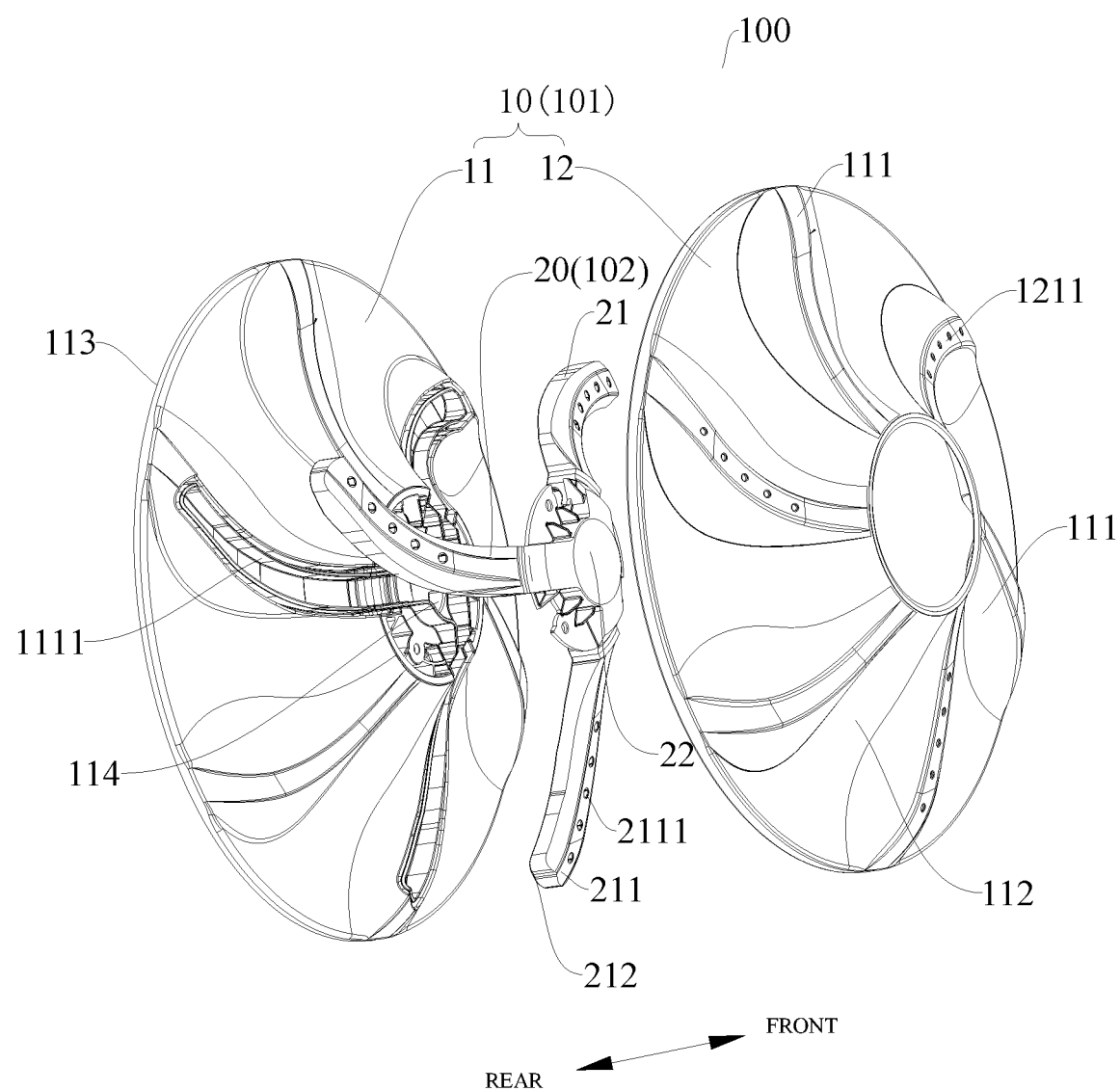
FIG. 3 is another exploded view of an agitator for a drum washing machine according to some embodiments of the present disclosure.
Figure 4:
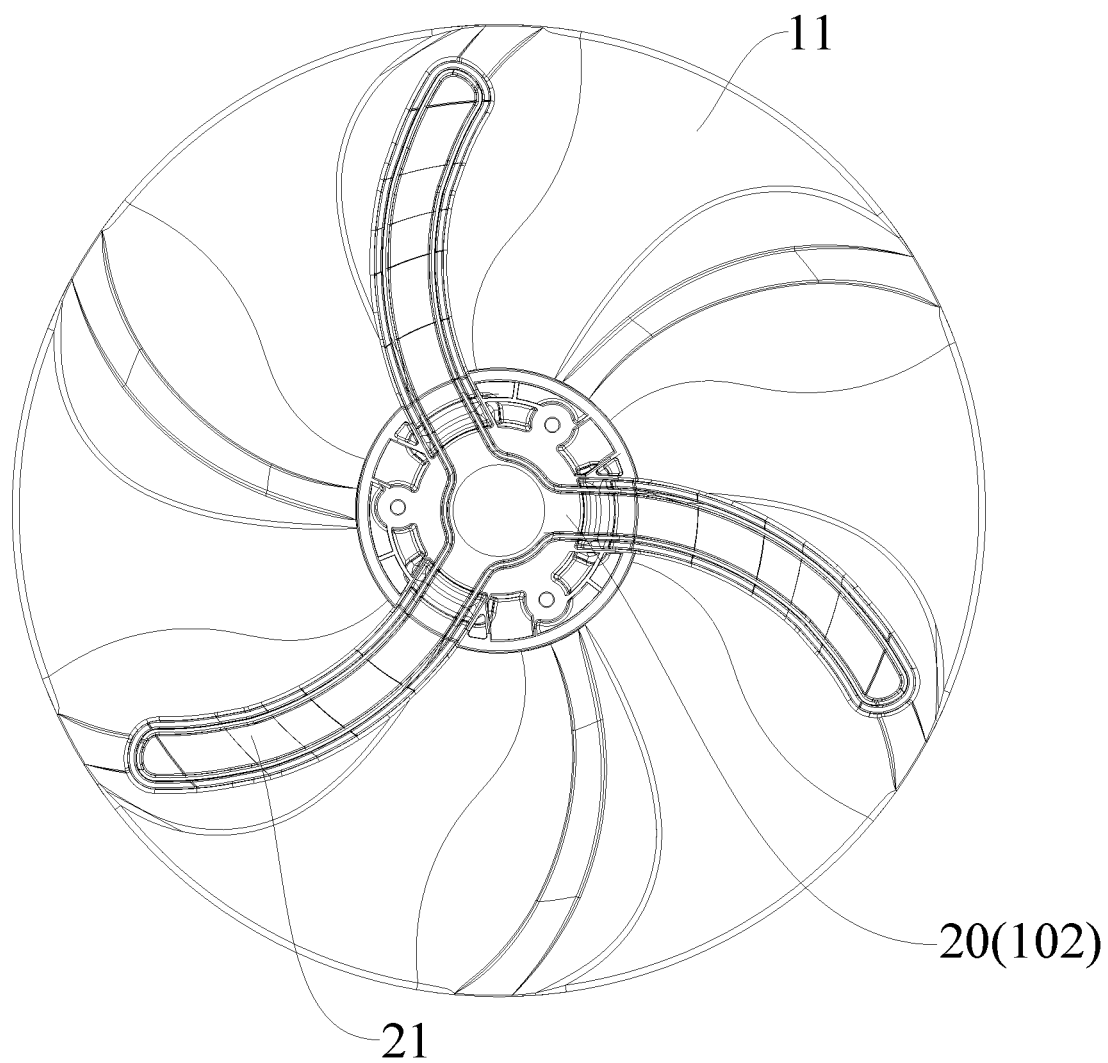
FIG. 4 is an assembly view of an agitator for a drum washing machine according to some embodiments of the present disclosure.
Figure 5:
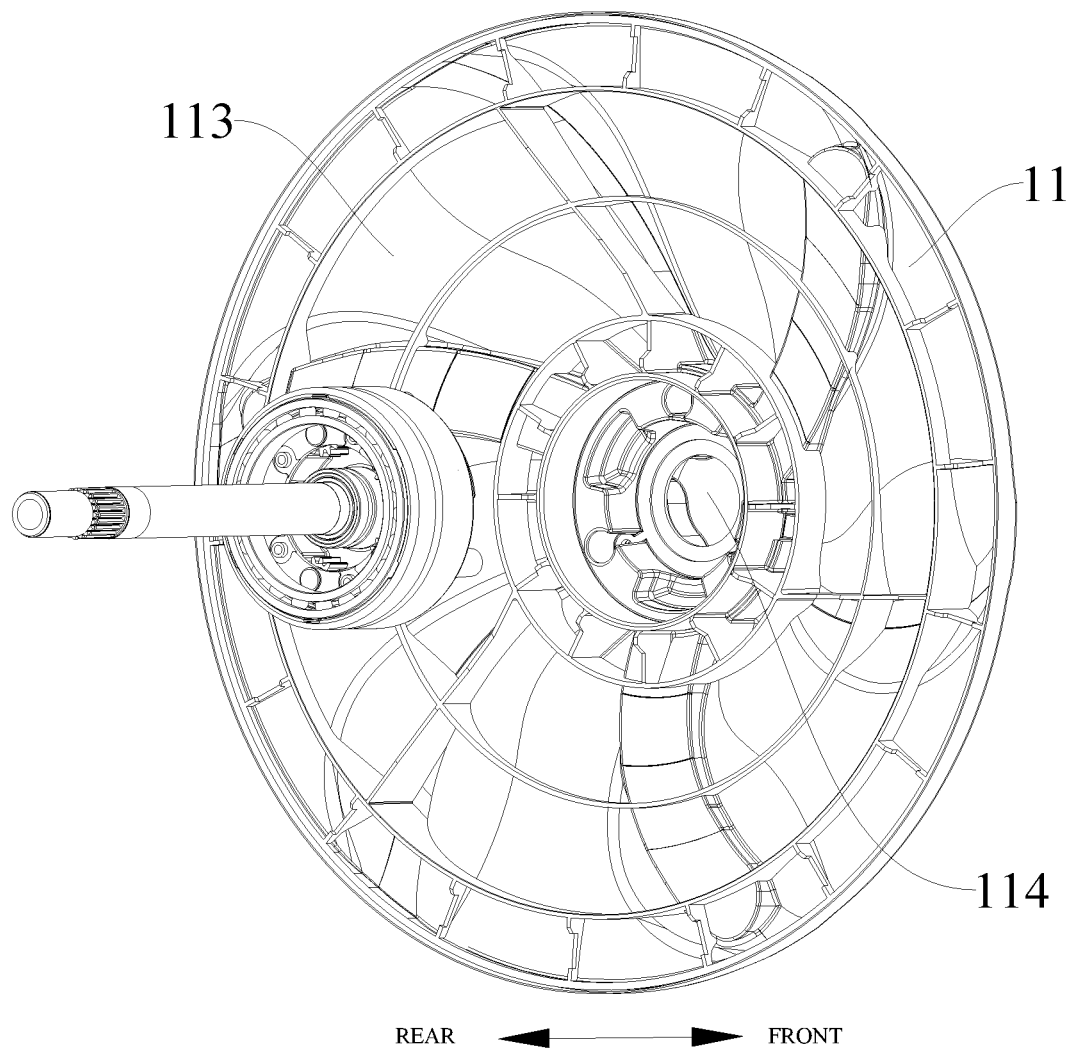
FIG. 5 is a schematic view of an agitator for a drum washing machine according to some embodiments of the present disclosure.
Figure 6:
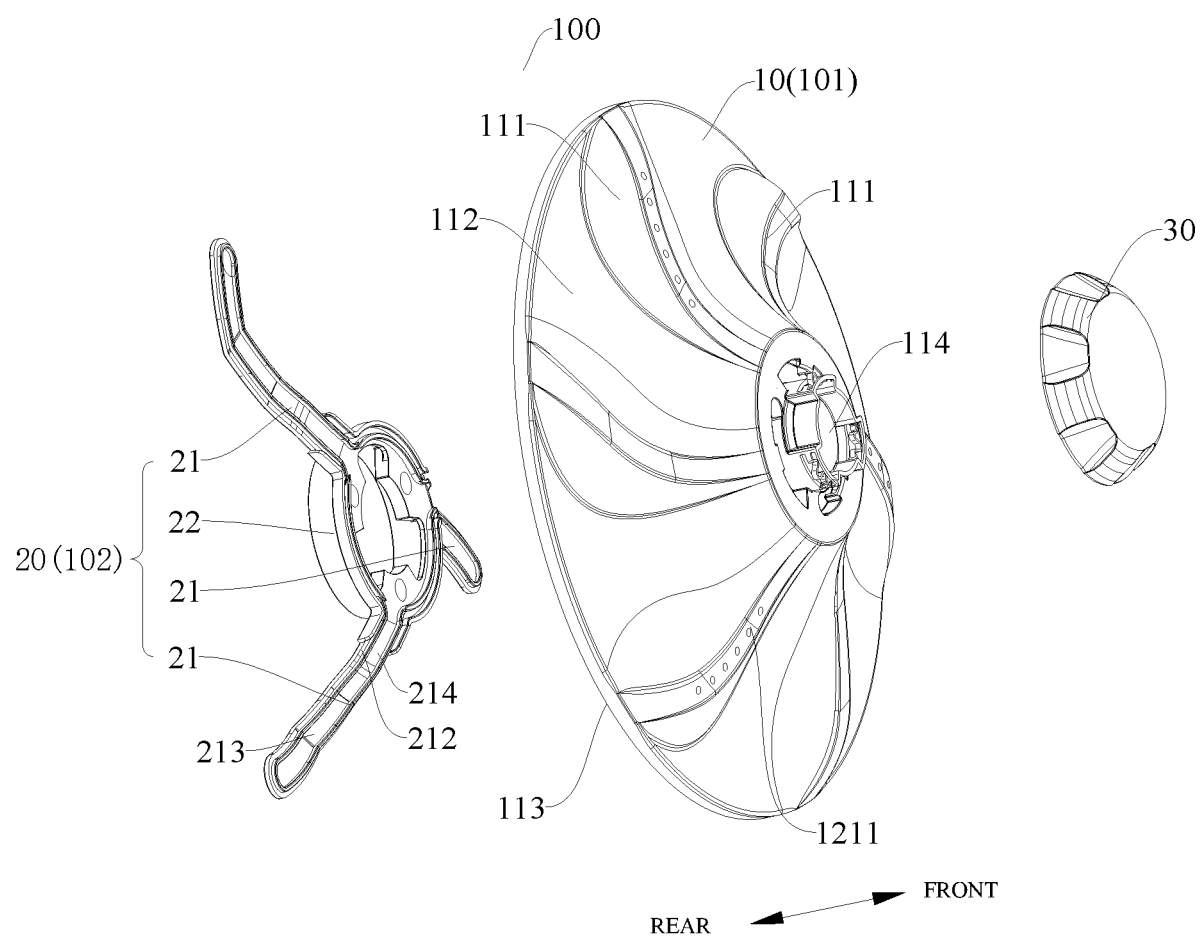
FIG. 6 is an exploded view of an agitator for a drum washing machine according to other embodiments of the present disclosure.
Figure 7:
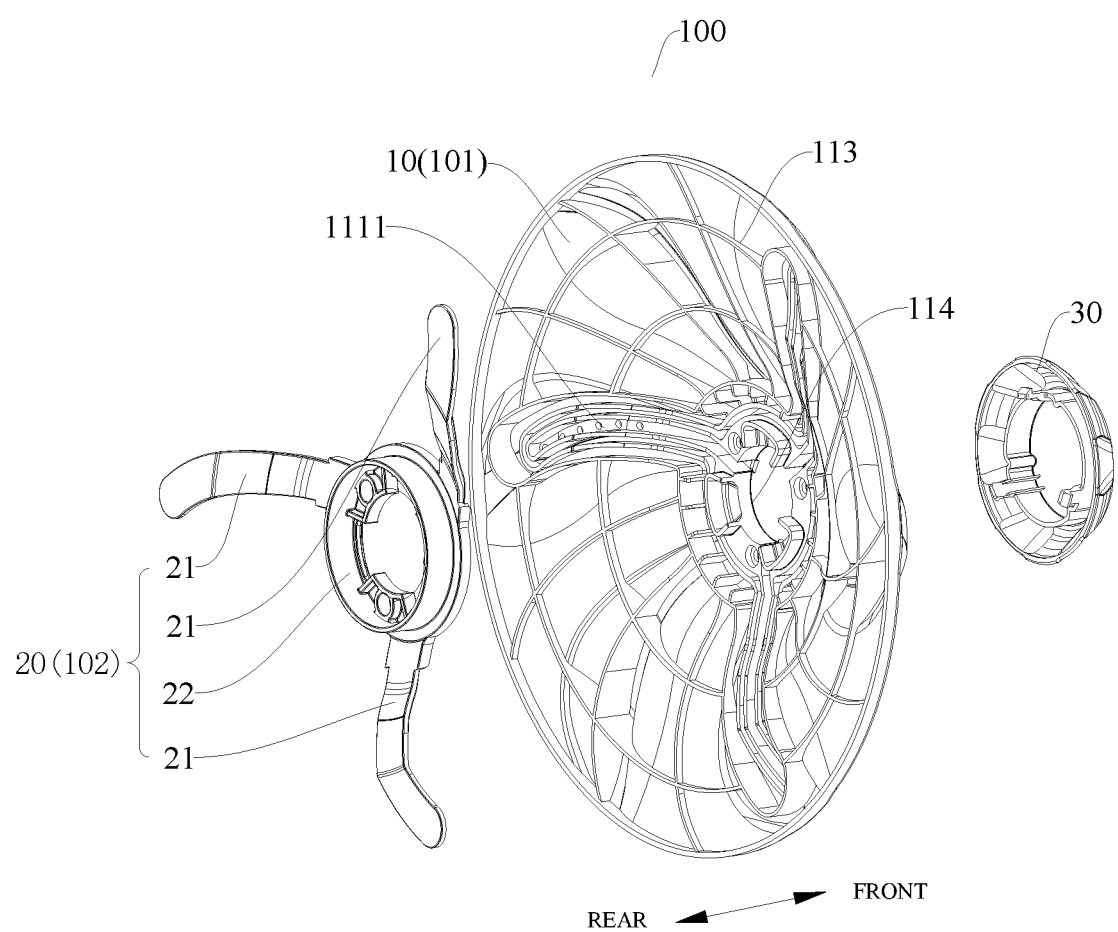
FIG. 7 is another exploded view of an agitator for a drum washing machine according to other embodiments of the present disclosure.
Figure 8:
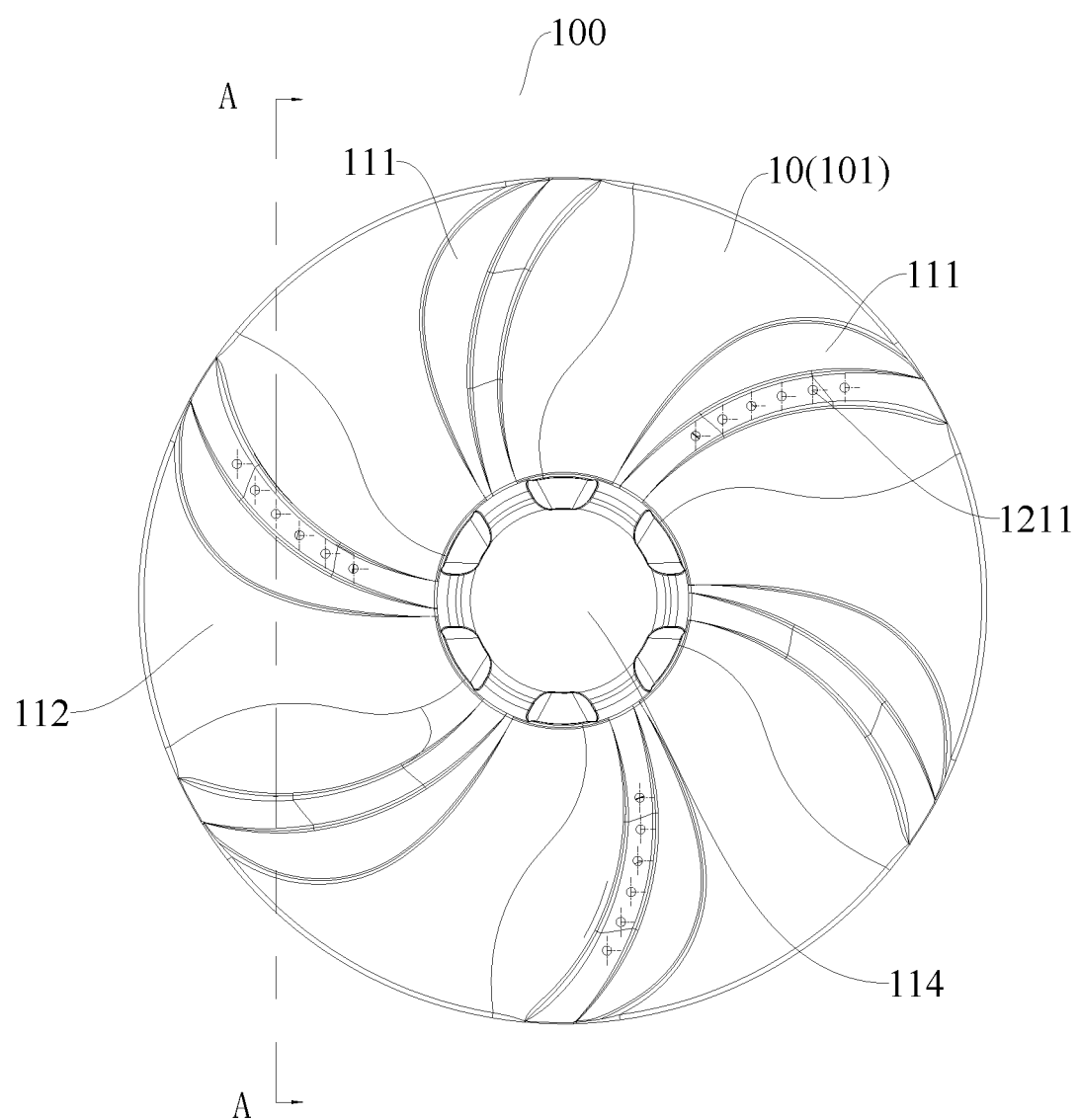
FIG. 8 is a top view of an agitator for a drum washing machine according to further embodiments of the present disclosure.
Figure 9:
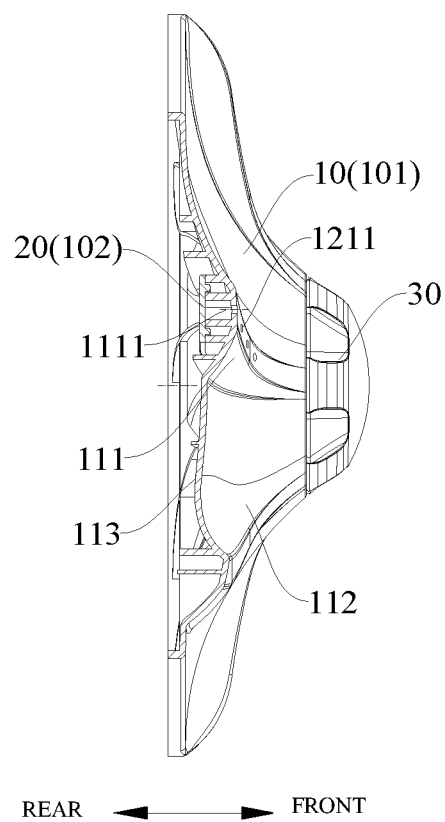
FIG. 9 is a sectional view taken along line A-A in FIG. 8.
Figure 10:
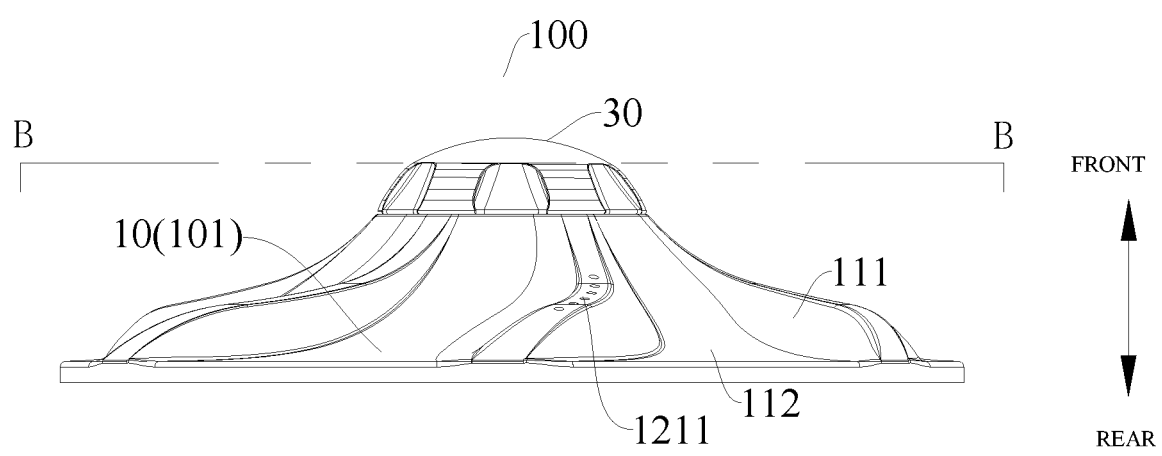
FIG. 10 is a side view of an agitator for a drum washing machine according to other embodiments of the present disclosure.
Figure 11:
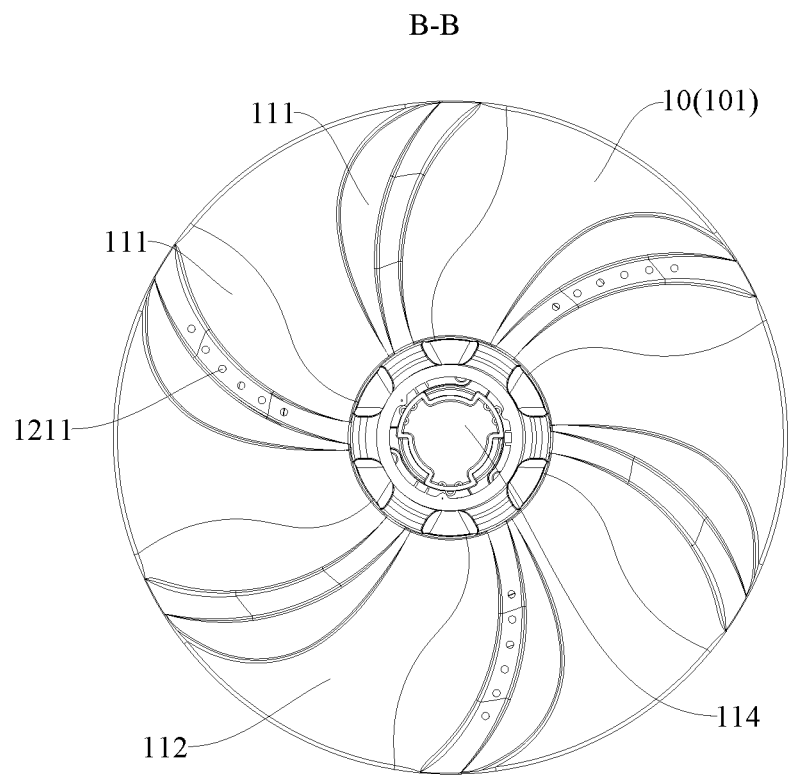
FIG. 11 is a sectional view taken along line B-B in FIG. 10.
Figure 12:
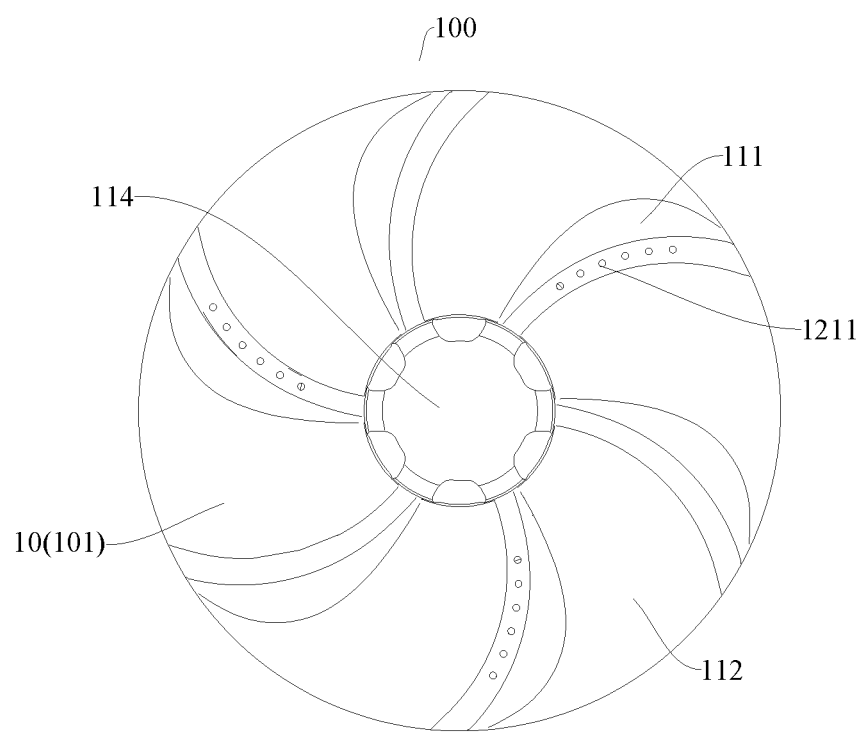
FIG. 12 is a top view of an agitator for a drum washing machine according to yet other embodiments of the present disclosure.
Figure 13:
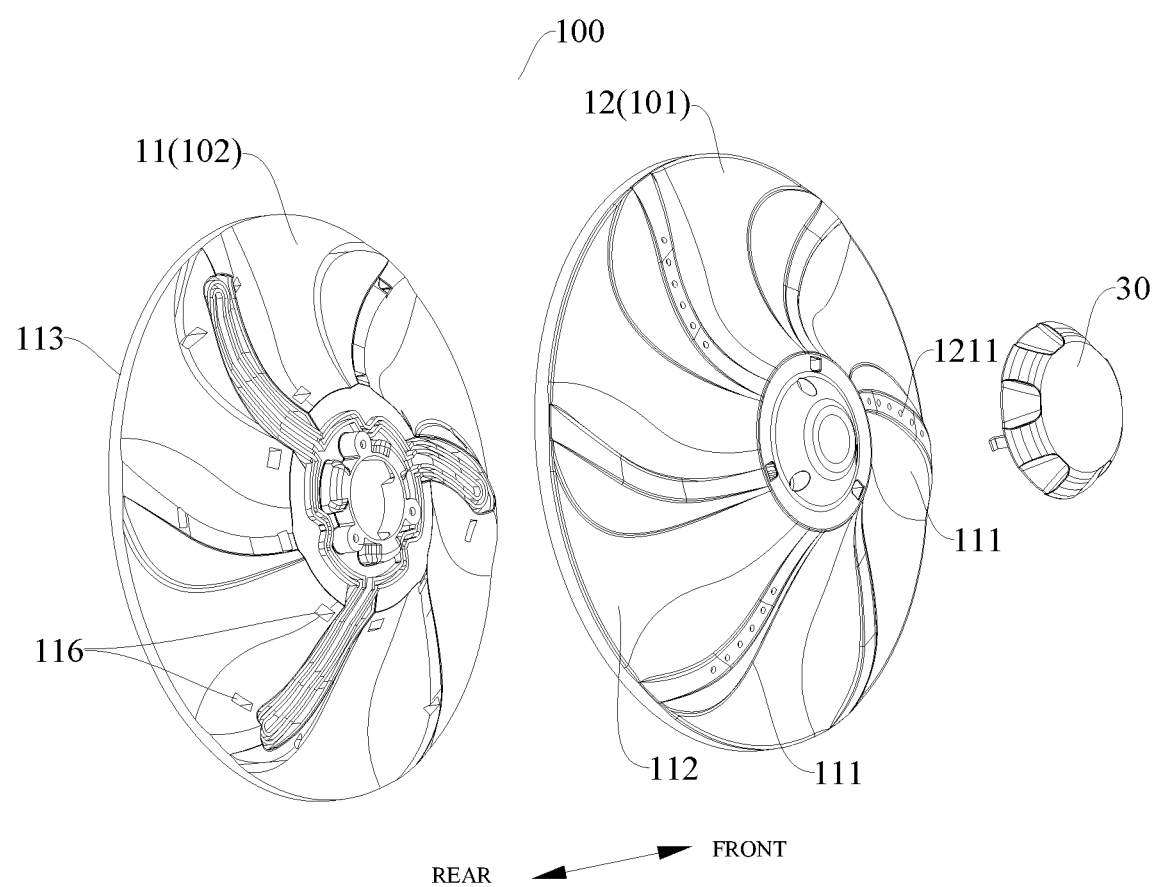
FIG. 13 is an exploded view of an agitator for a drum washing machine according to still other embodiments of the present disclosure.

In some embodiments of the present disclosure, as shown in FIGS. 3, 6 and 13, the agitating surface 112 of the first agitating subsection 101 is provided with a plurality of agitating ribs 111, and the plurality of agitating ribs 111 are arranged at intervals along the circumferential direction of the agitating surface 112 of the first agitating subsection 101. The water spray channel corresponds to the position of at least one of the plurality of agitating ribs 111, and the water spray holes 1211 are distributed in the at least one of the plurality of agitating ribs 111 and communicate with the water spray channel at the corresponding position.

In other words, the water spray channel may be located at the rear side of at least one of the plurality of agitating ribs 111 and communicate with the water spray holes 1211 in the agitating ribs 111, so that on the one hand, the agitating ribs 111 can be used to improve the beating strength of clothes to improve the washing effect, and on the other hand, the clothes can be sprayed water and washed through the water spray holes 1211 communicating with the water spray channel to realize the double washing effect.

In one embodiment, as shown in FIGS. 3, 6, and 13, in the circumferential direction of the agitating surface 112 of the first agitating subsection 101, one of two adjacent agitating ribs 111 corresponds to the position of the water spray channel and is provided with water spray holes 1211 communicating with the water spray channel.

In other words, the agitating ribs 111 corresponding to the positions of the water spray channels and the agitating ribs 111 not provided with the water spray channels are alternately arranged in the circumferential direction of the agitating surface 112 of the first agitating subsection 101, so that not only the agitating strength of the agitating ribs 111 can be ensured, but also the spraying washing effect and the spraying uniformity of the agitating ribs 111 on clothes can be ensured. Moreover, by alternately arranging the agitating ribs 111 corresponding to the positions of the water spray channels and the agitating ribs 111 not provided with the water spray channels, the mixed washing effects combining the spraying washing and the agitating washing of the first agitating subsection 101 can be ensured and at the same time, the structure is simplified, and the manufacturing cost is reduced.

In some embodiments of the present disclosure, as shown in FIGS. 1-12, the first agitating subsection 101 may be an agitating disk 10, and the second agitating subsection 102 may be a spray frame 20. The spray frame 20 may be mounted in the agitating disk 10, for example, may be embedded in the agitating disk 10. The front surface of the agitating disk 10 forms the agitating surface 112, and the rear surface (the surface facing away from the washing cavity, i.e., the rear surface) of the agitating disk 10 forms a mounting surface 113.

In order to facilitate the assembly of the spray frame 20, the agitating disk 10 is provided with fitting grooves 1111, and the spray frame 20 can be mounted in the fitting grooves 1111 and defines water spray channels together with the inner walls of the fitting grooves 1111. For example, the spray frame 20 has an inner cavity 213, the surface of the inner cavity 213 facing the bottom wall of the fitting groove 1111 is open to define the water spray channels together with the bottom walls of the fitting grooves 1111.

In one embodiment, the spray frame 20 includes a central water collecting block 22 and a plurality of water distributing arms 21. The plurality of water distributing arms 21 are arranged at intervals along the circumferential direction of the central water collecting block 22 and are connected to the outer circumferential surface of the central water collecting block 22. The plurality of water distributing arms 21 can be respectively positioned at the rear sides of the corresponding agitating ribs 111. Each water distributing arm 21 is provided with a plurality of water passing holes 2111, and the water passing holes 2111 serve to communicate the spray water channel and the water spray holes 1211, i.e., water in the spray water channel can be sprayed from the water spray holes 1211 through the water passing holes 2111. It is understood that the water passing hole 2111 may be through holes formed in the water distributing arm 21 or may be formed by open portions of the water distributing arm 21, so long as the purpose of passing water is fulfilled.

In order to further improve the washing effect, the water passing holes 2111 of each water distributing arm 21 are arranged at the end of the water distributing arm 21 away from the central water collecting block 22. In this way, when the agitator 100 rotates, because the water passing holes 2111 are arranged at the outer end of the water distributing arm 21, greater centrifugal force can be obtained, improving the spraying intensity and the washing effect.

However, in order to realize multi-directional spraying washing of clothes and increase the spray range, the spray directions of the plurality of water passing holes 2111 in each water distributing arm 21 may be different. For example, the axial direction of each water passing hole 2111 is different from each other, and the axial directions of the water spray holes 1211 and the axial directions of the corresponding water passing holes 2111 are parallel to each other, so that water flow spray can be realized in different spray directions, improving the washing effect.

In some embodiments of the present disclosure, as shown in FIGS. 1-5, the agitating disk 10 includes a disk base 11 and a disk cover 12. The mounting surface 113 may be formed on the rear surface of the disk base 11. The disk cover 12 is mounted on the disk base 11 and covers the front surface of the disk base 11. The agitating surface 112 is formed on the front surface of the disk cover 12. The spray frame 20 is disposed between the disk base 11 and the disk cover 12, so that the spray frame 20 is fixed by the disk cover 12 and the disk base 11.

In one embodiment, the disk base 11 is provided with fitting grooves 1111, which are open toward the surface of the disk cover 12, i.e., the fitting grooves 1111 are formed in the front surface of the disk base 11. The spray frame 20 is mounted in the fitting grooves 1111 of the disk base 11 from front to back, and then the disk cover 12 is mounted to fix and cover the spray frame, and the spray frame 20 can be pressed and mounted in the fitting grooves 1111 by the disk cover 12, embedding the spray frame 20 in the disk base 11. Therefore, the overall volume of the agitator 100 is reduced. The spray frame 20 can be secured in multiple directions by using the fitting grooves 1111, improving the stability of the spray frame 20 and thus the stability of the washing effect.

As shown in FIG. 3, the spray frame 20 has an inner cavity 213, and the spray frame 20 may be composed of front walls 211 and peripheral side walls 212 provided at the peripheral edges of the front walls 211. The front walls 211 and the peripheral side walls 212 jointly define the inner cavity 213, and the surface of the inner cavity 213 facing the bottom walls of the fitting grooves 1111 is open (i.e., the rear surface is open) to define the water spray channels with the bottom walls (front walls) of the fitting grooves 1111 jointly.

In one embodiment, the disk cover 12 is a sheet metal part, and the sheet metal part can be directly hemmed and mounted on the disk base 11, which can simplify the process of connecting the two parts, ensure the fixing reliability of the spray frame 20 located in the middle, and also ensure the overall appearance effect of the agitator 100.

In order to communicate with water in the washing cavity or the external water source, the center of the mounting surface 113 of the disk base 11 of the agitating disk 10 is provided with a water inlet hole 114. The water inlet hole 114 is in communication with water in the washing cavity or the external water source, and the water spray channels extend outward from the water inlet hole 114. For example, the water in the washing cavity can be conveyed to the spray frame 20 through a circulating pump, a circulating pipeline 43, a water passing shaft 42, and the water inlet hole 114, and then divided into each water distributing arm 21 of the spray frame 20 to be sprayed out of the water spray holes 1211 through the water spray channel. It is also possible to directly convey the water from the external water source to the spray frame 20 through the pipeline 43, the water passing shaft 42 and the water inlet hole 114, and then divide the water into the water distributing arms 21, realizing spray washing through the water spray holes 1211 in communication with the spray water channels.

In other embodiments of the present disclosure, as shown in FIGS. 6-12, the agitating disk 10 may also be of integral structure. the mounting surface 113 (i.e., the rear surface) of the agitating disk 10 is provided with fitting grooves 1111, and the rear surfaces of the fitting grooves 1111 are open. The spray frame 20 is mounted in the fitting grooves 1111 from rear to front, and the spray frame 20 and the agitating disk 10 are ultrasonically welded, whereby the spray frame 20 and the agitating disk 10 can be fixedly connected through ultrasonic welding, and jointly define water spray channels to facilitate spraying washing.

As shown in FIG. 6, the spray frame 20 may be composed of bottom walls 214 and peripheral side walls 212 provided at the peripheral edges of the bottom walls. The bottom walls 214 and the peripheral side walls 212 together define an inner cavity 213. The inner cavity 213 is open toward the surfaces of the bottom walls of the fitting grooves 1111 (i.e., the front surface of the inner cavity 213 is open). The open surface of the inner cavity 213 is covered by the bottom walls of the fitting grooves 1111 (i.e., the front walls of the fitting grooves 1111), jointly defining water spray channels. The open front surfaces of the water distributing arms 21 are formed with water passing holes 2111.

In order to communicate with water in the washing cavity or the external water source, the center of the mounting surface 113 of the agitating disk 10 is provided with a water inlet hole 114. The water inlet hole 114 is in communication with the water in the washing cavity or the external water source, and the water spray channels extend outward from the water inlet hole 114. For example, the water in the washing cavity can be conveyed to the spray frame 20 through a circulating pump, a circulating pipeline 43, a water passing shaft 42, and the water inlet hole 114, and then divided into each water arm 21 of the spray frame 20 to be sprayed out of the water spray holes 1211 through the water spray channels. It is also possible to directly convey the water from the external water source to the spray frame 20 through the pipeline 43, the water passing shaft 42 and the water inlet hole 114, and then divide the water into each water distributing arm 21, realizing spray washing through the water spray holes 1211 in communication with the spray water channels.

In some other embodiments of the present disclosure, as shown in FIGS. 13-16, the first agitating subsection 101 is a disk cover 12 and the second agitating subsection 102 is a disk base 11. The disk base 11 and the disk cover 12 can be snapped with each other, forming water spray channels between the two to realize spraying washing.

Meanwhile, the agitating surface 112 is formed on the front surface of the disk cover 12 and the mounting surface 113 is formed on the rear surface of the disk base 11, so that agitating washing can be realized through the agitating surface 112 of the disk cover 12, realizing two different washing modes of agitating washing and spraying washing, which can not only be convenient for users to select, but also can effectively improve the washing effect.

Figure 14:
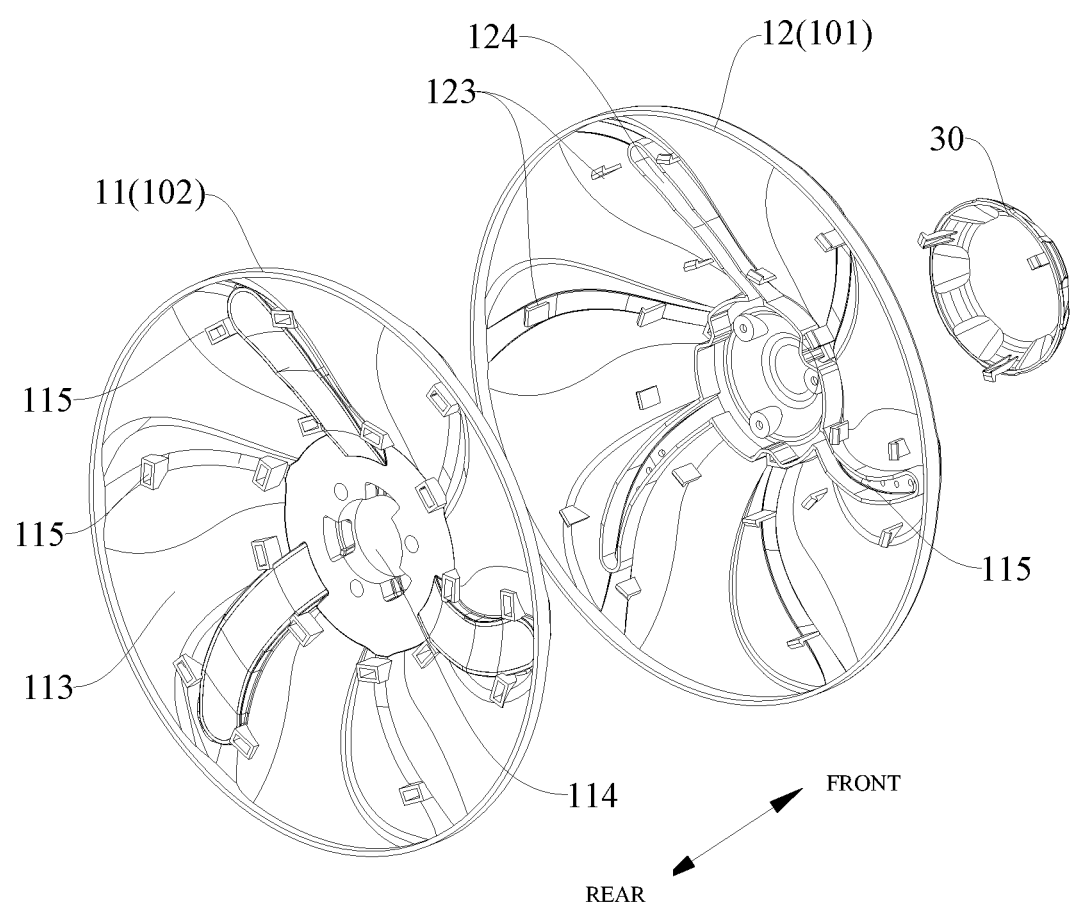
FIG. 14 is another exploded view of an agitator for a drum washing machine according to further embodiments of the present disclosure.
Figure 15:
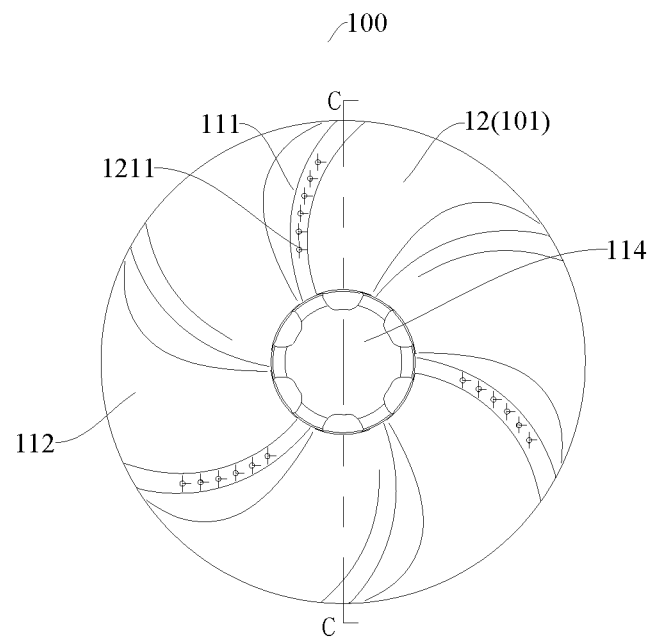
FIG. 15 is a top view of an agitator for a drum washing machine according to still other embodiments of the present disclosure.
Figure 16:
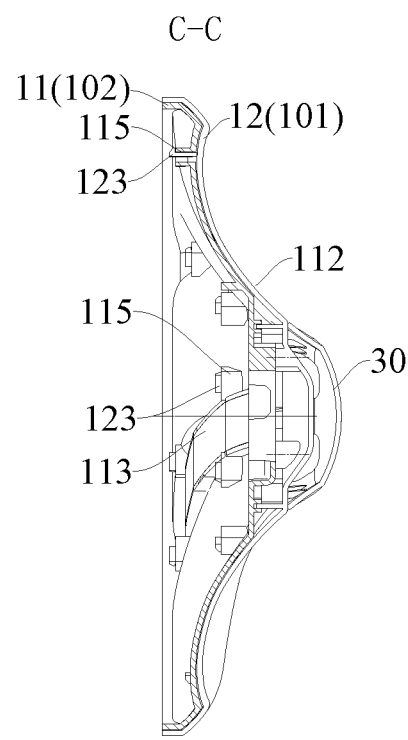
FIG. 16 is a sectional view taken along line C-C in FIG. 15.

As shown in FIG. 14, at least one of the disk cover 12 and the disk base 11 is provided with water flumes 124 to ensure the formation of the water spray channels. After the disk cover 12 and the disk base 11 are snapped together, the water flumes 124 are covered to form water spray channels. For example, in the example shown in FIG. 14, the disk cover 12 and the disk base 11 are respectively provided with water flumes 124. After the disk base 11 is snapped and connected with the disk cover 12, the water flumes 124 in the disk cover 12 and the water flumes 124 in the disk base 11 are combined with each other and enclosed to form the water spray channels through which water supply flow passes and sprays out through the water spray holes 1211 to realize spray washing.

As shown in FIG. 14, in some examples, one of the disk base and the disk cover 12 is provided with locking slots 115 and the other is provided with snaps 123. For example, in this example, the disk base is provided with locking slots 115 and the disk cover 12 is provided with snaps 123, and the positions of the locking slots 115 and the snaps 123 correspond to each other, so that the disk cover 12 and the disk base can be fixedly connected through the snap-fitting of the locking slots 115 and the snaps 123. The structure is simple and the manufacturing is convenient.

In order to communicate with the water in the washing cavity or the external water source, the center of the mounting surface 113 of the disk base 11 is provided with a water inlet hole 114. The water inlet hole 114 is in communication with the water in the washing cavity or the external water source. The water spray channels extend outward from the water inlet hole 114. For example, the water in the washing cavity can be conveyed to the water spray channels through a circulating pump, a circulating pipeline 43, a water passing shaft 42 and the water inlet hole 114, and then sprayed out of the water spray holes 1211 after being divided. It is also possible that the water in the external water source is directly conveyed to the water spray channels through the pipeline 43, the water passing shaft 42 and the water inlet hole 114, and sprayed out of the water spray hole 1211 after being divided to realize spraying washing.

In the above embodiment of the present disclosure, the agitator 100 may further include an agitating cap 30 mounted on the agitating surface 112 of the first agitating subsection 101. For example, in the embodiment shown in FIGS. 1 to 5, the agitating cap 30 is mounted at the center of the agitating surface 112 of the disk cover 12. In the embodiment shown in FIGS. 6-12, the agitating cap 30 is mounted at the center of the agitating surface 112 of the agitating disk 10. In the embodiment shown in FIGS. 13-16, the agitating cap 30 is mounted at the center of the agitating surface 112 of the disk cover 12. By providing the agitating cap 30, in cooperation with the first agitating subsection 101, the water inlet hole 114 is enclosed to prevent water leakage.

In one embodiment, certain shown in FIGS. 1-5, the agitating cap 30 includes a cap base 31 and a surface cap 32. The cap base 31 may be a plastic part, and the cap base 31 is mounted on the agitating surface 112 of the first agitating subsection 101 to enclose the middle of the first agitating subsection 101. Furthermore, the agitating cap 30 can be conveniently formed, manufactured and low in cost. The surface cap 32 is covered on the surface of the cap base 31, and the surface cap can be a sheet metal part, so that the overall appearance effect can be ensured.

Figure 17:
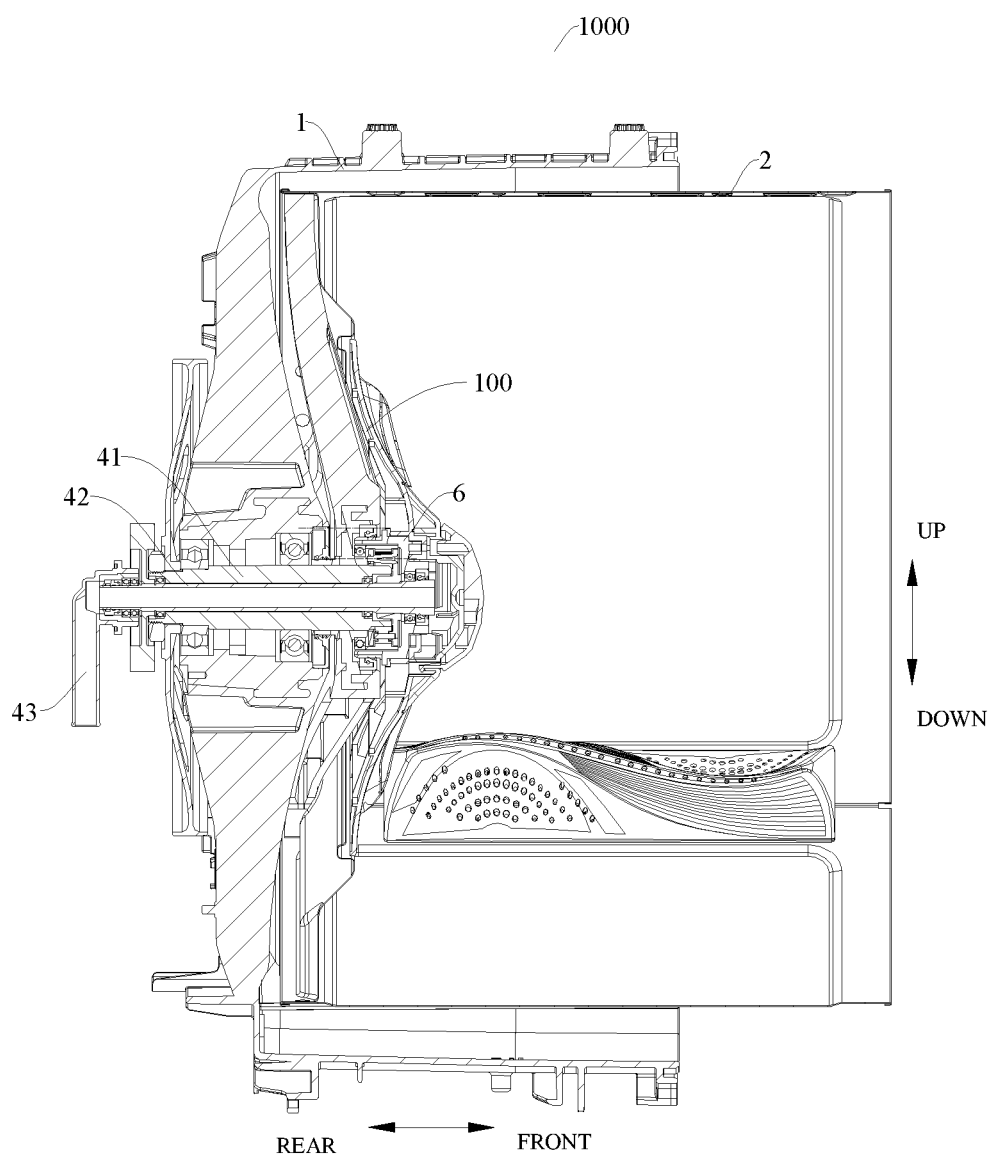
FIG. 17 is a sectional view of a drum washing machine according to an embodiment of the present disclosure.

The drum washing machine 1000 according to an embodiment of the present disclosure, as shown in FIG. 17, includes the agitator 100 for a drum washing machine according to the above-mentioned embodiment of the present disclosure.

The drum washing machine according to the embodiment of the present disclosure has the characteristics of simple structure, various washing modes, good washing effect, low manufacturing cost and the like while improving washing effect and reducing washing time by adopting the agitator 100 for the drum washing machine according to the embodiment.

In some embodiments of the present disclosure, as shown in FIG. 17, a drum washing machine 1000 according to an embodiment of the present disclosure includes an outer tub 1, an inner drum 2, an agitator 100, a driver (not shown in the figure), a planetary gear assembly 6, and a water supply device (not shown in the figure).

The inner drum 2 is rotatably provided in the outer tub 1. The agitator 100 is rotatably mounted in the inner drum 2, and the agitator 100 has water spray holes 1211. The driver is in driving connection with the inner drum 2 through a spindle 41 which transmits the torque of the driver to the inner drum 2.

The planetary gear assembly 6 is respectively in driving connection with the spindle 41 and the agitator 100. When the driver drives the spindle 41 to rotate, the planetary gear assembly 6 can transmit the torque of the spindle 41 to the agitator 100, driving the agitator 100 to rotate. The water supply device is respectively in communication with the outer tub 1 or the water source and the agitator 100. The water supply device supplies water in the outer tub 1 or the water source to the agitator 100 and sprays the water into the inner drum 2 through the water spray holes 1211.

According to the drum washing machine 1000 of the embodiment of the present disclosure, by providing the driver and driving the inner drum 2 to rotate by driving the spindle 41 to rotate using the driver, and by further providing the agitator 100 in the inner drum 2 and transmitting torque to the agitator 100 from the spindle 41 through the planetary gear assembly 6 to drive the agitator 100 to rotate, the rotation of the agitator 100 and the rotation of the inner drum 2 can be combined with each other into various washing modes. For example, any one of the agitator 100 and the inner drum 2 rotates alone, or the agitator 100 and the inner drum 2 rotate simultaneously, or the agitator 100 and the inner drum 2 rotate in the same direction or in the opposite direction.

In the washing process of the clothes, the water supply device supplies water to the agitator 100, and the water spray holes 1211 spray water to the clothes in the inner drum 2, playing a role of wetting the clothes and improving the clothes wetting effect. At the same time, the agitator 100 can agitate the water in the inner drum 2, thus diversifying the washing modes of the drum washing machine 1000, improving the washing effect of the clothes and being beneficial to reducing the washing time.

In addition, the driver drives the inner drum 2 through the spindle 41 to directly drive components with larger loads using the driver, so that the number of stages of power transmission is less and the power transmission is more direct, stably driving the inner drum with larger volume and containing clothes and water. By arranging the planetary gear assembly 6 between the spindle 41 and the agitator 100, the torque of the spindle 41 is transmitted to the agitator by using the planetary gear assembly 6 to indirectly drive the agitator 100 using the driver. Since the load at the agitator 100 is much less than the load in the inner drum 2, the load acting on the planetary gear assembly 6 is greatly reduced compared with a drum washing machine with a pulsator (agitator) in the related art, which is not only beneficial to the stable transmission of power to improve the performance stability of the drum washing machine 1000, but also greatly reduces the risk of damage to the planetary gear assembly 6 to prolong the service life of the drum washing machine 1000.

Other structural examples and operations of the agitator 100 for a drum washing machine and the drum washing machine 1000 having the same according to the embodiments of the present disclosure and will not be described in detail herein.

In the description of this specification, the description referring to terms "one embodiment", "some embodiments", "exemplary embodiments", "examples", "specific examples", or "some examples" and the like means that the specific features, structures, materials, or characteristics described in connection with the embodiment or example are included in at least one embodiment or example of the present disclosure. In this specification, the schematic representation of the above-mentioned terms does not necessarily refer to the same embodiment or example. Moreover, the specific features, structures, materials, or characteristics described may be combined in any one or more embodiments or examples in a suitable manner.

What is claimed is:

1. An agitator for a drum washing machine, comprising:
a first agitating subsection having an agitating rib facing a washing cavity, the agitating rib of the first agitating subsection being provided with water spray holes;
a second agitating subsection, wherein the second agitating subsection and the first agitating subsection are separate parts, and the second agitating subsection and the first agitating subsection are mounted and jointly define a water spray channel in communication with the water spray holes; and
an agitating cap mounted on the agitating rib of the first agitating subsection;
wherein the first agitating subsection is an agitating disk, the second agitating subsection is a spray frame, the spray frame is mounted in the agitating disk, the agitating rib is formed on the agitating disk, and the agitating disk is provided with a mounting surface facing away from the washing cavity;
wherein the agitating disk comprises:
a disk base on which the mounting surface is formed; and
a disk cover mounted on the disk base and on which the agitating rib is formed, wherein the spray frame is mounted between the disk base and the disk cover, wherein a surface of the disk base facing the disk cover is provided with a fitting groove, and the spray frame is pressed into the fitting groove by the disk cover.

2. The agitator for a drum washing machine according to claim 1, wherein the agitating rib of the first agitating subsection is configured with a plurality of agitating ribs spaced apart from each other along a circumferential direction thereof, the water spray channel corresponds to a position of at least one of the plurality of agitating ribs, and the water spray holes are arranged in the at least one of the plurality of agitating ribs.

3. The agitator for a drum washing machine according to claim 2, wherein one of two adjacent agitating ribs corresponds to a position of the water spray channel and is provided with the water spray holes, in a circumferential direction of the first agitating subsection.

4. The agitator for a drum washing machine according to claim 1, wherein the agitating disk is provided with a fitting groove, and the spray frame is mounted in the fitting groove and defines the water spray channel together with an inner wall of the fitting groove.

5. The agitator for a drum washing machine according to claim 4, wherein the spray frame has an inner cavity, a surface of the inner cavity facing a bottom wall of the fitting groove is open, and the open surface of the inner cavity is covered by the bottom wall of the fitting groove to define a spray channel.

6. The agitator for a drum washing machine according to claim 4, wherein a center of the mounting surface of the agitating disk is provided with a water inlet hole in communication with a water source, and the water spray channel extends outwards from the water inlet hole.

7. The agitator for a drum washing machine according to claim 1, wherein the spray frame comprises:
a central water collecting block;
a plurality of water distributing arms, spaced apart from each other along a circumferential direction of the central water collecting block, connected to an outer circumferential surface of the central water collecting block, and provided with water passing holes correspondingly in communication with the water spray holes.

8. The agitator for a drum washing machine according to claim 7, wherein the water passing holes in each of the water distributing arms are arranged at an end of each of the water distributing arms away from the central water collecting block.

9. The agitator for a drum washing machine according to claim 7, wherein axial directions of the water passing holes are different from each other, and an axial direction of the water spray holes is parallel to an axial direction of each corresponding water passing hole.

10. The agitator for a drum washing machine according to claim 1, wherein the mounting surface of the agitating disk is provided with a fitting groove, and the spray frame is arranged in the fitting groove and ultrasonically welded to the agitating disk.

11. The agitator for a drum washing machine according to claim 1, wherein the first agitating subsection is the disk cover, the second agitating subsection is the disk base, the disk cover and the disk base are snapped with each other, the agitating rib is formed on the disk cover and the disk base is provided with the mounting surface facing away from the washing cavity.

12. The agitator for a drum washing machine according to claim 11, wherein at least one of the disk cover and the disk base is provided with a water flume, and the water flume is enclosed to form the water spray channel after the disk cover and the disk base are snapped with each other.

13. The agitator for a drum washing machine according to claim 12, wherein one of the disk cover and the disk base is provided with a snap and the other is provided with a locking slot, and the snap is snapped into the locking slot.

14. The agitator for a drum washing machine according to claim 11, wherein a water inlet hole in communication with a water source is defined in a center of the mounting surface of the disk base, and the water spray channel extends outwards from the water inlet hole.

15. The agitator for a drum washing machine according to claim 1, wherein the agitating cap comprises:
a cap base mounted on the agitating rib of the first agitating subsection;
a surface cap covering the cap base.

16. A drum washing machine, comprising:
an agitator for the drum washing machine, comprising:

a first agitating subsection having an agitating rib facing a washing cavity, the agitating rib of the first agitating subsection being provided with water spray holes;

a second agitating subsection, wherein the second agitating subsection and the first agitating subsection are separate parts, and the second agitating subsection and the first agitating subsection are mounted and jointly define a water spray channel in communication with the water spray holes; and an agitating cap mounted on the agitating rib of the first agitating subsection;

wherein the first agitating subsection is an agitating disk, the second agitating subsection is a spray frame, the spray frame is mounted in the agitating disk, the agitating rib is formed on the agitating disk, and the agitating disk is provided with a mounting surface facing away from the washing cavity;

wherein the agitating disk comprises:

a disk base on which the mounting surface is formed; and a disk cover mounted on the disk base and on which the agitating rib is formed, wherein the spray frame is mounted between the disk base and the disk cover, wherein a surface of the disk base facing the disk cover is provided with a fitting groove, and the spray frame is pressed into the fitting groove by the disk cover.

17. The drum washing machine according to claim 16, further comprising:

an outer tub;

an inner drum, rotatably provided in the outer tub, and the agitator being rotatably provided in the inner drum;

a driver in driving connection with the inner drum through a spindle, the spindle transmitting a torque of the driver to the inner drum;

a planetary gear assembly separately in driving connection with the spindle and the agitator, and transmitting a torque of the spindle to the agitator; and a water supply device separately in communication with one of the outer tub and a water source as well as the agitator, and supplying water in the outer tub or the water source to the water spray channel of the agitator, and water being sprayed into the inner drum through the water spray holes.

* * * * *